CIRCUIT ARRANGEMENT FOR PRODUCING A CONTROL VOLTAGE

Filed April 25, 1958

INVENTORS
PETER JOHANNES HUBERTUS JANSSEN
WOUTER SMEULERS
BY Frank R. Jifari
AGENT

CIRCUIT ARRANGEMENT FOR PRODUCING A CONTROL VOLTAGE

Filed April 25, 1958

4 Sheets-Sheet 2

INVENTOR
PETER JOHANNES HUBERTUS JANSSEN
WOUTER SMEULERS

BY

AGENT

CIRCUIT ARRANGEMENT FOR PRODUCING A CONTROL VOLTAGE

Filed April 25, 1958 4 Sheets-Sheet 3

INVENTORS
PETER JOHANNES HUBERTUS JANSSEN
WOUTER SMEULERS
BY
Frank R. Trifari
AGENT INVENTOR
PETER JOHANNES HUBERTUS JANSSEN
WOUTER SMEULERS
BY
Frank R. Trifari
AGENT United States Patent Office 3,020,480
Patented Feb. 6, 1962

3,020,480
CIRCUIT ARRANGEMENT FOR PRODUCING A CONTROL VOLTAGE

Peter Johannes Hubertus Janssen and Wouter Smeulers, Eindhoven, Netherlands, assignors to North American Philips Company, Inc., New York, N.Y., a corporation of Delaware Filed Apr. 25, 1958, Ser. No. 730,947
Claims priority, application Netherlands May 2, 1957
6 Claims. (Cl. 328—26)

Figure 1:
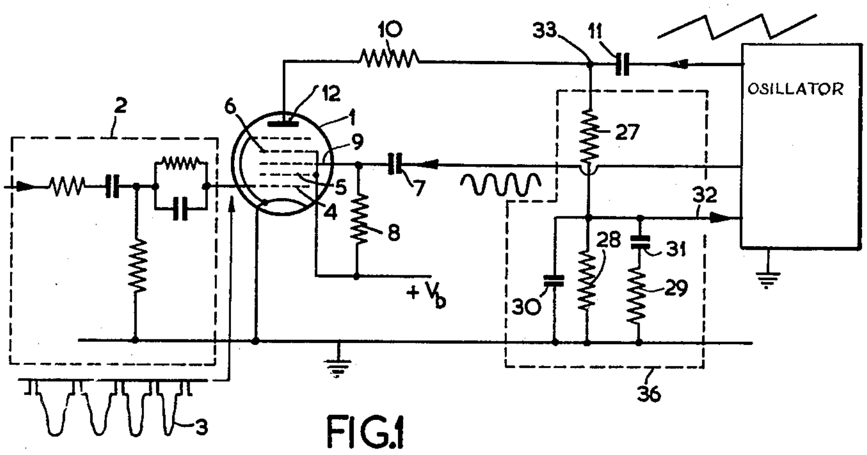

This invention relates to a circuit arrangement for producing a control voltage which is used to synchronise an oscillator with a synchronising signal, which circuit includes a multiple grid valve to a first control electrode of which there is supplied the synchronising signal while to a second control electrode there is supplied a control voltage derived from the oscillator.

Such circuit arrangements are used, for example, in television receivers in which the local oscillator is used for producing a control voltage by which the output valve for the line deflection current is controlled. Since the line deflection at the receiver end must be in synchronism with that at the transmitter end, the transmitter transmits synchronising pulses together with the video signal.

In known circuit arrangements of this kind using multiple grid valves, the synchronising signal is supplied to a first control electrode, there being applied to a second control electrode a control voltage which is derived from the local oscillator and may be sawtooth-shaped, sinusoidal or pulsatory, so that a control voltage is produced which is used for adjusting the local oscillator so that, if the variations which may occur either at the receiver or at the transmitter end are restricted to the hold range, synchronism is retained. The condition in which there is no frequency difference between the synchronising signal and the derived oscillation is referred to as the in-synchronism position, allowance being made for a certain phase difference between the two oscillations, provided that this is restricted to the so-called hold range.

The second control voltage which is derived from the local oscillator is not only used to compare its phase with that of the incoming synchronising signal, but also ensures that the valve is cut off for large parts of the periods in which no synchronising pulses are applied, so that this circuit arrangement has the advantage of a slight sensitivity to interference in the hold range so that synchronism is ensured even if disturbances occur.

In the out-of-synchronism position these asymmetrical circuit arrangements have a limitation in that synchronism cannot be restored automatically. This is due to the fact that owing to the application of the second control voltage, the tube passes no current when the phase difference between this voltage and the synchronising signal becomes excessively large, so that the control voltage assumes another value, with the result that the local oscillator is moved to a frequency outside the lock-in range so that it becomes impossible to bring the oscillator in synchronism with the synchronizing signal.

The circuit arrangement in accordance with the invention obviates this disadvantage and is characterized in that there is supplied to the third electrode a control voltage which is also derived from the oscillator, the control voltage supplied to the second control electrode being applied thereto through a network having a small time constant, while this second control electrode is also connected, through part of this network, to a direct-voltage source which supplies a positive direct voltage.

In order that the invention may readily be carried out, one embodiment thereof will now be described, by way of example, with reference to the accompanying drawings, in which:

FIG. 1 shows a circuit arrangement which may be used in television receivers, and FIGS. 2, 3, 4, 5, 6, 7 and 8 are illustrative diagrams.

In FIG. 1, valve 1 is a multiple-grid valve which acts as a phase detector in a television receiver. To this end, a video signal 3 including positive-going synchronising pulses is supplied to the first grid 4 of this valve through a network 2. By means of grid rectification, the peaks of the synchronising pulses are brought to cathode potential. The positive direct voltage $V_b$ applied to grids 5 and 6 is small, for example about 8 volts, so that the grid base for this first grid is also small with the result that only during the occurrence of the synchronising pulses current can flow in the valve.

Whether current will actually flow is also determined by a keying voltage, which may be sinusoidal and is supplied to a second control grid 9 of the valve 1. This keying voltage is obtained from the oscillator and for this purpose the second grid 9 is coupled through an RC-network comprising a capacitor 7 and a resistor 8 and having a small time constant, which may be equal to or twice the time of one period of the sinusoidal oscillation if the oscillator signal is not sinusoidal, or another form of keying voltage is desired, a further deforming network may be included between the oscillator and RC network for giving the keying voltage the desired form. The positive supply voltage $V_b$ is also supplied to the second control grid 9 of valve 1 through the resistor 8.

A third positive sawtooth-shaped control voltage is supplied to the anode 12 of the valve 1. This sawtooth shaped voltage may be obtained directly from the oscillator if this oscillator delivers a sawtooth voltage, or via a suitable deforming network if this is not the case. The sawtooth shaped control voltage is fed to anode 12 through a comparatively large resistor 10 of, say, about 100 KΩ. This resistor 10 may be drawn as a load-line in the family of $I_a$–$V_a$ curves of the valve 1 using $V_{g1}$ as a parameter (see FIG. 2).

In this figure, the line 39 may be the load-line at a maximum voltage $V_{a\ max}$ which is set up across the resistor 10. The anode voltage $V_{a0\ max}$ is found by projecting the point of intersection of the line 39 with the limit characteristic onto the $V_a$-axis. If this point of intersection is chosen below the parameter curve for $-0.5\ V_{g1}$ and if the value $-0.5\ V_{g1}$ is that value of the voltage at the first grid at which the grid current sets in, the magnitude of the anode current will remain constant even if the image information is different from line to line, so that the peaks of the synchroizing pulses are at different levels.

Figure 2:
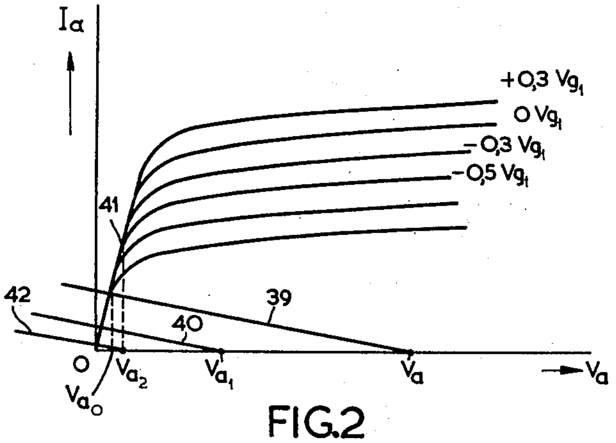

In addition, the load-line will be displaced to the left owing the applied sawtooth voltage, see for example the line 40 in FIG. 2, so that effectively anode modulation is obtained which enables the anode current to be controlled.

At very small values of the voltage across the resistor 10, the anode current of the valve 1 will be substantially suppressed, while without the provision of this resistor there would have been an appreciable anode current in this event (see for example the load-line 42 at $V_{a2}$).

Figure 3:
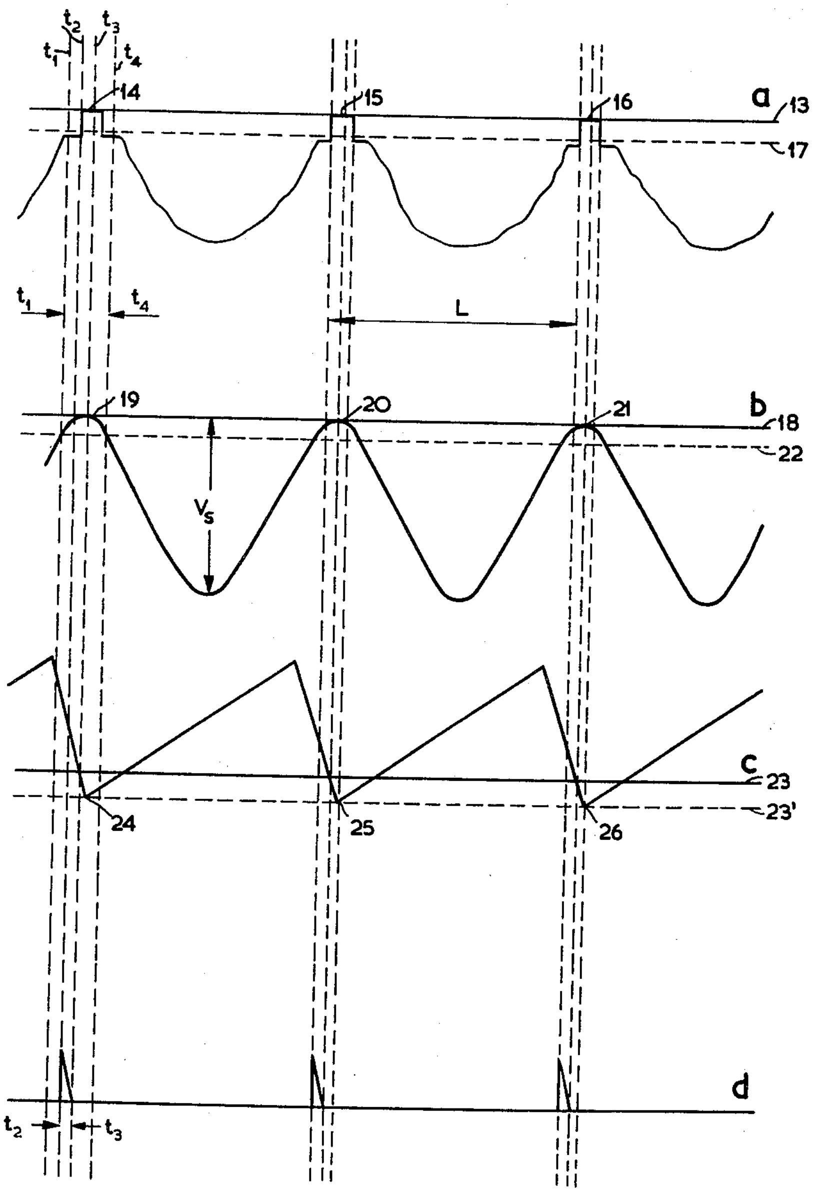

This is illustrated in greater detail in FIG. 3. In this figure, FIG. 3*a* shows the entire video signal which is supplied to the grid 4 of the valve 1. The line 13 denotes the level of the cathode potential to which the peaks of the synchronising signals 14, 15 and 16 are raised. The line 17 indicates the level at which the potential at the grid 4 has a value such that the valve 1 is cut off. Consequently, current can flow only during the occurrence of the synchronising pulses. FIG. 3*b* shows diagrammatically the sinusoidal signal which has a peak-to-peak value $V_s$ and is supplied to the grid 9. In this figure, the line 18 again denotes the level of the cathode potential to which the peaks 19, 20 and 21 will be raised owing to the rectifying action of the grid 9 together with the capacitor 7 and the resistor 8, if the phase difference between the oscillation produced by the oscillator to be controlled and the pulse repetition frequency of the synchronising signal remain within the hold range. If the line 22 denotes the cut-off level of the grid 9 when the grid 4 of valve 1 has cathode potential applied to it, it will be seen from FIG. 3*b* that anode current can flow during the period $t_1$–$t_4$, if the sinusoidal signal is supplied only to the grid 9. When the signals shown in FIGS. 3*a* and 3*b* are applied simultaneously, anode current can again flow only during the occurrence of the synchronising signals.

FIG. 3*c* shows the sawtooth voltage which is supplied to the capacitor 11. The line 23 designates the level at which the anode current will be cut off in the in-synchronism position owing to the provision of the resistor 10. The distance between the line 23′ on which are situated the minimum values 24, 25 and 26 and the line 23 substantially corresponds to the value $V_{a2}$ of FIG. 2.

Owing to the three co-operating voltages, anode current will now flow only during the period $t_2$–$t_3$. The shape of the anode current flowing in this event is shown in FIG. 3*d*.

It should be noted that the advantage of a slight sensitivity to interference is retained for the in-synchronism position, for if interference occurs, it will only be able to penetrate into the anode circuit during the period $t_1$–$t_3$. Before the instant $t_1$, the sinusoidal voltage set up at the grid 9 ensures that no anode current can flow and after the instant $t_3$ the sawtooth voltage applied to the anode 12 of the tube 1 ensures that no anode current can flow since at that instant the anode voltage goes below the valve designated by the line 23. The sinusoidal voltage together with the sawtooth voltage ensures the production of a limited aperture angle and consequently a slight sensitivity to interference.

With respect to the in-synchronism position, anode current now flows during the period $t_2$–$t_3$. However, when slight phase shifts of the synchronising pulses relative to the sinusoidal and sawtooth voltages occur, the instant $t_2$ which is determined by the leading edge of the applied synchronising pulse can be shifted to the left and to the right. Thus, the trailing edge of the synchronising pulse may be advanced to an instant prior to the instant $t_3$, so that this instant $t_3$ is determined by this trailing edge and no longer by the anode voltage.

Figures 4, 5:
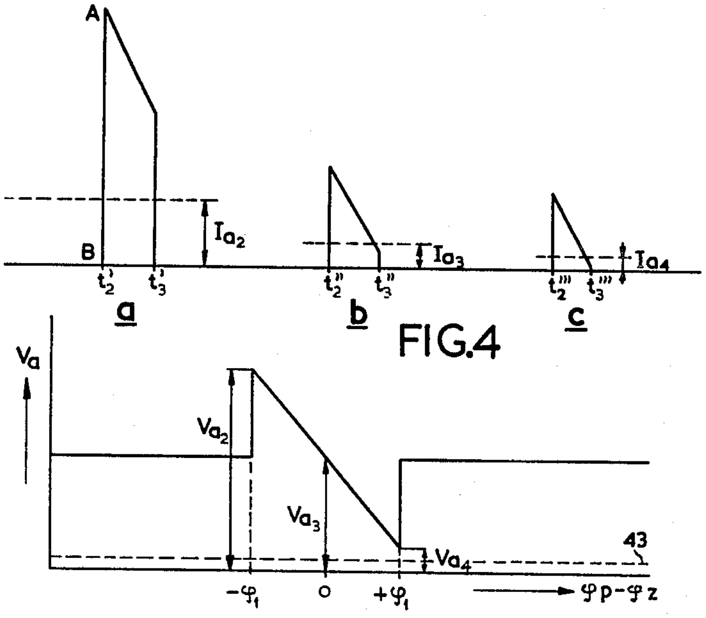

Assuming now that the sinusoidal voltage is not applied to the grid 9 and that this grid has cathode potential applied to it, the anode current is enabled to flow during the instants at which the voltage at the anode of the valve 1 has risen in accordance with FIG. 3*c* to above the cut-off level indicated by the line 23 and the voltage at the grid 4 has risen in accordance with FIG. 3*a* to above the cut-off level designated by the line 17. With respect to the in-synchronism position, the synchronising pulses are only allowed to shift at the most through a distance $t_1$–$t_3$, as is shown in FIG. 3. If the leading edge of the synchronising pulse 14 is situated at the point $t_2$, there will flow an anode current indicated in FIG. 3*d*. If the synchronising pulse is shifted to the right, the anode current is decreased; if the synchronising pulse is shifted to the left, the anode current is increased as is shown in FIG. 4. FIG. 4*a* shows the shape of the anode current in the event that the leading edge of the synchronising pulse coincides with the maximum value of the sawtooth voltage, and FIGS. 4*b* and 4*c* show the conditions in which the leading edge is shifted to the right. $I_{a2}$ ($I_{a2}$=mean value of $I_{a2}$), $I_{a3}$ ($I_{a3}$=mean value of $I_{a3}$) and $I_{a4}$ ($I_{a4}$=mean value of $I_{a4}$) show the associated mean anode currents. The associated mean anode voltages $V_{a2}$ ($V_{a2}$=mean value of $V_{a2}$), $V_{a3}$ ($V_{a3}$=mean value of $V_{a3}$) and $V_{a4}$ ($V_{a4}$=mean value of $V_{a4}$) are shown in FIG. 8*c*. The arrangement described hereinbefore provides a known method of setting up across a smoothing network 36, which comprises resistors 27, 28 and 29 and capacitors 30 and 31, a direct voltage which can be taken from the point 32 and can be supplied to the oscillator to be controlled. As a function of the phase difference, the direct voltage thus produced is shaped as shown in FIG. 5. In this condition, $\varphi_p=\varphi_z$ corresponds to the mean in-synchronism position with which are associated a mean anode current $I_{a3}$ ($I_{a3}$=mean value of $I_{a3}$) and a direct voltage $V_{a3}$ ($V_{a3}$=mean value of $V_{a3}$). With respect to the extreme in-synchronism positions, the mean anode current is $I_{a2}$ ($I_{a2}$=mean value of $I_{a2}$) or $I_{a4}$ ($I_{a4}$=mean value of $I_{a4}$) respectively, and the direct voltage is $V_{a2}$ ($V_{a2}$=the mean value of $V_{a2}$) or $V_{a4}$ ($V_{a4}$= mean value of $V_{a4}$) respectively.

Figure 6:
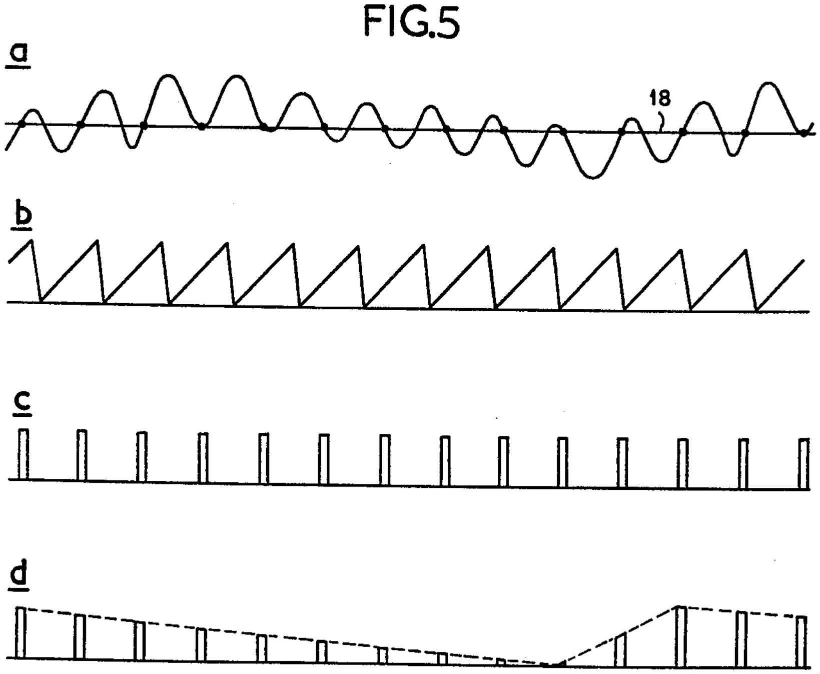
Figure 7:
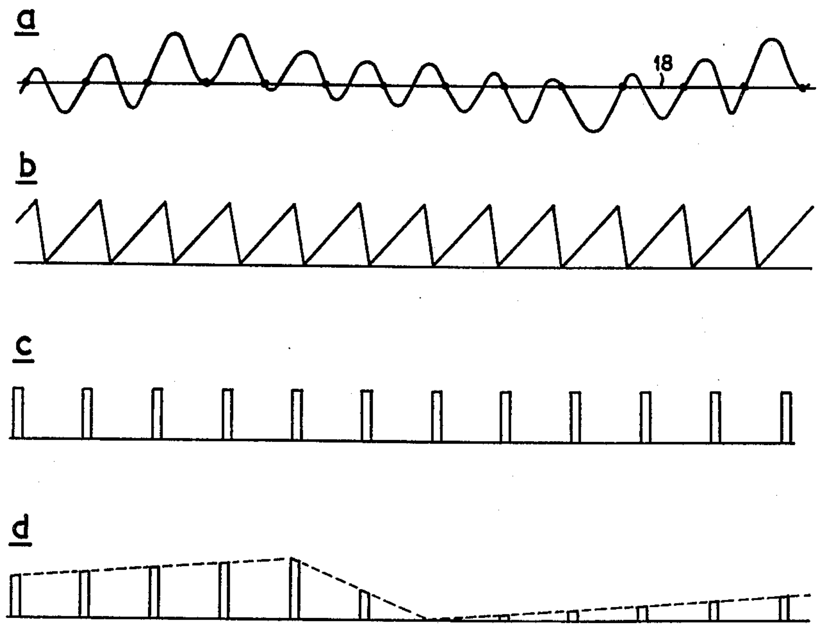
Figure 8:
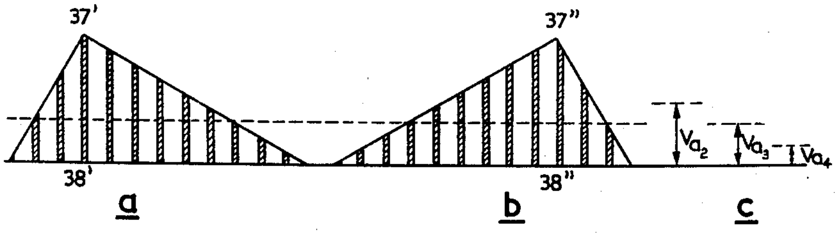

If the phase shift of the synchronising pulse is greater than that described hereinbefore, a condition is produced as indicated in FIG. 6 or FIG. 7.

For a clear distinction, the condition in which the synchronising pulse occurs at the instants at which the non-steep edge of the sawtooth voltage is produced, is referred to as the out-of-synchronism position, while the condition in which the synchronising pulse occurs at the instants at which the steep edge of the sawtooth voltage is produced, is referred to as the in-synchronism position.

These conditions are indicated in FIG. 5. In this figure; the region in which $-\varphi_1<\varphi_p-\varphi_z<\varphi_1$ is the in-synchronism or hold range and the regions in which $\varphi_p-\varphi_z<-\varphi_1$ and $\varphi_p-\varphi_z>\varphi_1$ the out-of-synchronism range. Without further steps, in such a condition, the mean direct voltage would drop to the mean value $V_a$, as is indicated by the line 43 in FIG. 5.

With respect to the out-of-synchronism position, FIGS. 6*b* and 6*c* will now be discussed for the cases in which the pulse repetition frequency $f_p$ is greater than the frequency of the sawtooth voltage $f_z$ ($f_p>f_z$) and FIGS. 7*b* and 7*c* for the case that $f_p<f_z$. In this event, the value of the anode current during the occurrence of the synchronising pulses (shown in FIGS. 6*c* and 7*c* respectively) is determined by the instantaneous value of the anode voltage (shown in FIGS. 6*b* and 7*b* respectively). The anode current pulses are shown in FIGS. 6*d* and 7*d* respectively, from which it will be seen that the envelope of these instantaneous values is a triangle the peak value of which is equal to the value AB in FIG. 4*a*. The identical voltage triangles of the enveloping current triangles are shown diagrammatically in FIGS. 8*a* and 8*b* respectively. The mean amplitude of the anode current pulses as shown in FIGS. 6*d* and 7*d* respectively will be substantially equal to one half of the side 37, 38 of a right-angled triangle (see FIG. 6*d* or 7*d*) and substantially equal to the current shown diagrammatically in FIG. 4*b*, so that the voltage produced is also substantially equal to the mean value $V_{a3}$. This is shown diagrammatically in FIG. 8*c*. These values will never become identical, however, this is not absolutely necessary since it is only required for the oscillator, to be controlled, to be returned to the hold range $-\varphi_1$ to $+\varphi_1$.

This means that, when the receiver is brought into the out-of-synchronism positions by external causes (changing over to another transmitter, voltage surges, and so on), there is always produced automatically a voltage substantially equal to the mean value $V_{a3}$ which is smoothed by means of the network 36 and is supplied to the oscillator so that $f_p$ remains substantially equal to $f_z$. Consequently, the oscillator is restored to the in-synchronism position, the conventional control mechanism subsequently ensuring a complete adjustment of the oscillator until $f_p$ is equal to $f_z$.

We will now observe the function of the sinusoidal voltage which is supplied to the grid 9. In the in-synchronism position, the peaks of the synchronising pulses substantially coincide with the peaks 19, 20 and 21 of the sinusoidal signal. Since the valve 1 is conductive during the occurrence of the synchronising pulses, the grid 9 will also carry current during the occurrence of the peaks 19, 20 and 21, so that the capacitor 7 is charged in a manner such that the electrode of this capacitor 7 which is connected to the grid 9, becomes negative so that the said peaks are brought to cathode potential. However, according to the invention the RC-time of the network comprising the capacitor 7 and the resistor 8 is made very small, so that the capacitor can be rapidly discharged.

Thus, when an out-of-synchronism position occurs, so that the maximum values of the sinusoidal voltage do not always coincide exactly with the synchronising pulses, the voltage at the grid 9 is driven less negative, so that the entire mean level of the grid 9 about which the sinusoidal voltage varies is raised, for if no grid current flowed at all, this mean value would be raised to the positive supply voltage $V_b$ supplied to the grid 9 through the resistor 8. Since this supply voltage exceeds the amplitude of the sinusoidal voltage ($V_b > |\frac{1}{2} V_s|$), even the minimum values of the voltage shown in FIG. 3*b* are enabled to rise above the level indicated by the line 18 (see FIGS. 6*a* and 7*a* respectively). However, since current can flow during the occurrence of the synchronising pulses, the grid 9 will also carry grid current at these instants. That is to say, that now the part of the sinusoidal voltage occurring at this instant is equal to cathode potential, as is shown by black dots in FIGS. 6*a* and 7*a* respectively.

Consequently, the application of the sinusoidal voltage, the supply voltage $V_b$ and the choice of a short RC-time automatically bring the grid 9 to cathode potential during the occurrence of the synchronising pulses both in the in-synchronism and in the out-of-synchronism positions, so that current always flows during the occurrence of the synchronising pulses, even if the circuit arrangement is in the out-of-synchronism position.

Hence, all the effects described hereinbefore are produced so that the out-of-synchronism position is converted in an in-synchronism position, while in the in-synchronism position the advantage of a slight sensitivity to interference is retained owing to the gating action of the sinusoidal voltage applied to grid 9.

Consequently, the circuit arrangement in accordance with the invention combines the advantage of a slight sensitivity to disturbances with the advantage that the local oscillator is invariably brought into synchronism with the incoming synchronising signal.

A further advantage of the circuit arrangement consists in the complete absence of current pulses during the occurrence of the image synchronising pulses. This effect is produced during and/or after the image synchronising pulses having a pulse width exceeding that of the line synchronising pulses, so that the width of the anode current pulses would also be increased but this effect is avoided owing to the keying affect of the applied sinusoidal and sawtooth voltages.

It should be noted that a satisfactory design of the circuit arrangement in accordance with the invention requires the recognition that the sinusoidal voltage should never be applied to the first grid but only to a subsequent grid, for if this voltage were supplied to the first grid, the fact whether or not grid current flows would not depend upon the occurrence of the synchronising pulses but grid current would invariably flow during the peaks 19, 20 and 21 of the sinusoidal signal. The valve would be cut-off outside of these peaks and carry no current in the out-of-synchronism position.

What is claimed is:

1. A circuit arrangement for the production of a control voltage for synchronizing an oscillator with a synchronizing signal comprising an electron discharge device having in the order named a cathode, a first control electrode, a second control electrode, and a third electrode, means applying said synchronizing signal to said first control electrode, a resistance capacitance network, means applying a first alternating voltage derived from said oscillator to said third electrode, means applying a second alternating voltage derived from said oscillator to said second control electrode by way of said network, said network having a short time constant with respect to the period of said second alternating voltage, and output circuit means connected to said third electrode.

2. The circuit arrangement of claim 1, in which a resistor is connected serially between said third electrode and said means applying first alternating voltage, said resistor having a sufficiently high value that the third electrode current of said device is substantially independent of the amplitude of said synchronizing signal.

3. A circuit arrangement for the production of a control voltage for synchronizing an oscillator with a synchronizing signal comprising an electron discharge device having in the order named a cathode, a first control grid, a second control grid, and a third electrode, means applying said synchronizing signal between said first control grid and cathode, means applying a sawtooth voltage derived from said oscillator between said third electrode and cathode, a capacitor, means applying a sinusoidal voltage between said second control grid and cathode by way of said capacitor, a resistor and a source of positive direct voltage connected serially between said second control grid and cathode, and output circuit means connected to said third electrode, the time constant of said resistor and capacitor being small compared to the period of said sinusoidal voltage.

4. The circuit arrangement of claim 3, in which said third electrode comprises the anode of said electron discharge device.

5. The circuit arrangement of claim 4, in which a resistor is connected serially between said third electrode and said means applying said first alternating voltage to said third electrode, said last-mentioned resistor having a sufficiently high value that the anode current is determined by the phase relationship between said first alternating voltage and synchronizing signal and is substantially independent of the amplitude of said synchronizing signal.

6. A circuit for the production of a control voltage for synchronizing an oscillator with a synchronizing signal comprising an electron discharge device having in the order named, a cathode, a first control electrode, a second control electrode, and a third electrode, means applying said synchronizing signal between said first control electrode and said cathode whereby the peaks of said synchronizing signal are brought to cathode potential by grid rectification, means applying a first voltage derived from said oscillator to said third electrode, capacitor means applying a second voltage derived from said oscillator to said second control electrode, resistor means connected between said second control electrode and a point of low positive potential with respect to said cathode, the time constant of said resistor and capacitor being of the order of one period of said second voltage, and output circuit means connected to said third electrode.

References Cited in the file of this patent

UNITED STATES PATENTS

| | | |
|---|---|---|
| 2,192,715 | Peterson et al. | Mar. 5, 1940 |
| 2,405,239 | Seeley | Aug. 6, 1946 |
| 2,571,017 | Demsey et al. | Oct. 9, 1951 |
| 2,645,717 | Massman | July 14, 1953 |
| 2,794,077 | Olson | May 28, 1957 |
| 2,854,635 | Anderson | Sept. 30, 1958 |